United States Patent
Buchtel et al.

[15] 3,664,024
[45] May 23, 1972

[54] RETRIEVER FOR DENTAL SALIVA EJECTOR

[72] Inventors: Dean H. Buchtel; John A. Maurer, both of Canton, Ohio

[73] Assignee: The Weber Dental Manufacturing Company, Canton, Ohio

[22] Filed: Dec. 30, 1970

[21] Appl. No.: 102,698

[52] U.S. Cl. .................................................................32/22
[51] Int. Cl. ..........................................................A61c 19/02
[58] Field of Search ..........................242/100.2, 47.5; 32/22; 312/22

[56] References Cited

UNITED STATES PATENTS

| | | | |
|---|---|---|---|
| 1,844,511 | 2/1932 | Kiffe | 242/47.5 |
| 2,010,006 | 8/1935 | Bosch | 242/47.5 |
| 2,500,095 | 3/1950 | Ries et al. | 32/22 X |

Primary Examiner—Robert Peshock
Attorney—Frease & Bishop

[57] ABSTRACT

A retriever construction for positioning, retrieving and storing a flexible hose of a dental saliva ejector preferably within a dental console. A traveling car is slidably mounted on a vertical post having a fixed pulley at its upper end. The car has a pair of spaced pulleys and a locking mechanism. The ejector hose is looped around the fixed and car pulleys so that the car moves upward on the post as the hose is extended outward for use. The locking mechanism is selectively engaged in one of a plurality of positioning notches formed on the post and holds the hose in various extended positions of the hose. The car automatically returns the hose to retracted hose storage position looped around the pulleys when the locking mechanism is released upon full extension of the hose.

25 Claims, 14 Drawing Figures

Patented May 23, 1972

INVENTORS
DEAN H. BUCHTEL &
JOHN A. MAURER

BY *Frease & Bishop*
ATTORNEYS

INVENTORS
DEAN H. BUCHTEL &
JOHN A. MAURER

BY Frease & Bishop
ATTORNEYS

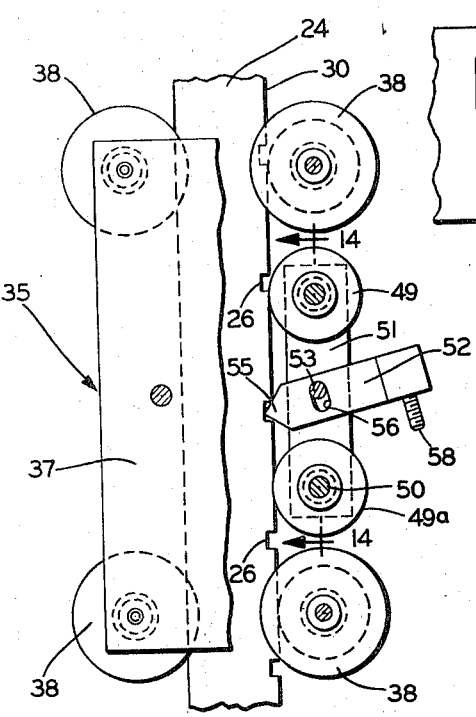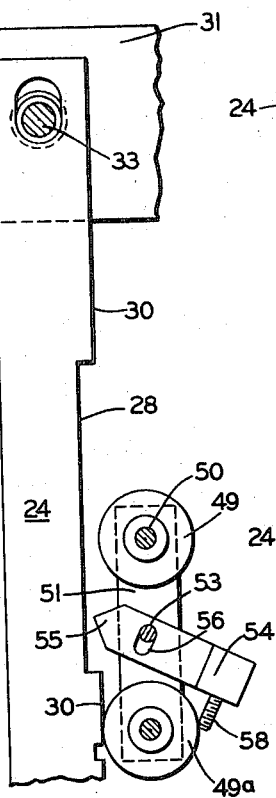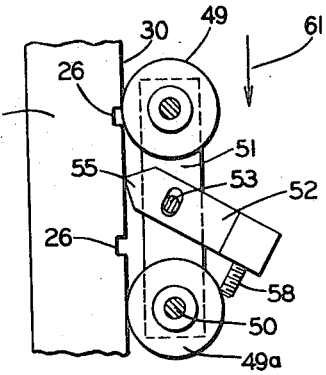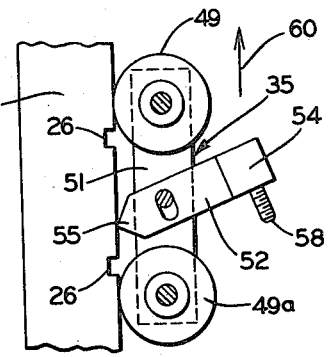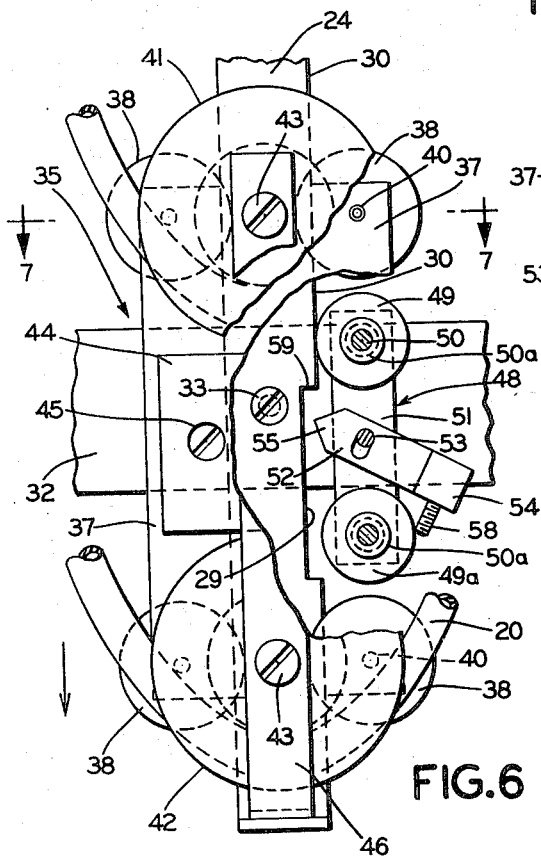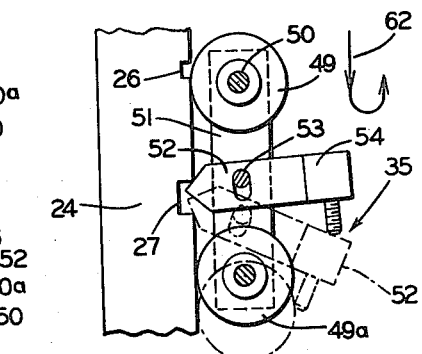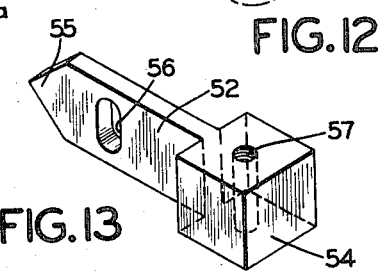
INVENTORS
DEAN H. BUCHTEL &
JOHN A. MAURER
BY Frease & Bishop
ATTORNEYS

RETRIEVER FOR DENTAL SALIVA EJECTOR

BACKGROUND OF THE INVENTION

1. Field of the Invention

The invention relates to a flexible hose retriever for a saliva ejector in a console in a dentist's or doctor's office; and more particularly to a retriever for a dental saliva ejector which permits an ejector supply hose to be easily withdrawn from retracted or storage position and held at various extended positions of use and which automatically returns the hose to storage position when its holding mechanism is released.

2. Description of the Prior Art

Prior art dental saliva ejectors traditionally have had the curved ejector mouthpiece at the end of the ejector hose releasably supported on a dental tray or extending through an opening in a dental cabinet. The ejector hose connected with vacuum pump means hung freely from the tray, and the hose might interfere with the dentist's movements. Usually when housed in a cabinet the hose had to be manually fed or threaded back into the cabinet where it could become tangled with other equipment.

Likewise, such facilities involved an excess amount of hose to eliminate tension on the mouthpiece and patient's mouth in use. None of these saliva ejector units provided a positive means of returning the hose to a retracted storage position or provided for withdrawal of only a minimum length of hose for any particular use without tension on the mouthpiece.

Various types of reel-type retrievers have been used in which the extension of the hose tensions a return spring within the retriever mechanism which retrieves the hose after releasing a manually operated positioning lock. These devices involve spring arrangements which require maintenance and replacement from time to time and sometimes also involve complicated locking mechanisms.

None of the known retrievers eliminate these problems by mechanism which combines positioning, positive retrieval, relative freedom from hose tension, and storage of a saliva ejector hose, characteristics which are important from the standpoint of convenience, ease of operation, appearance, and comfort to the patient.

SUMMARY OF THE INVENTION

Objectives of the invention include providing retriever mechanism for a dental saliva ejector hose which may be concealed as a hose storage means within a dental console; providing retriever mechanism which prevents a saliva ejector supply hose from becoming tangled upon return to or withdrawal from storage; providing retriever mechanism which permits the ejector supply hose to be easily and conveniently withdrawn from a retracted or stored position and held in various extended positions of use; providing retriever mechanism which eliminates tension on the mouthpiece of the saliva ejector and patient's mouth, except for the weight of the mouthpiece when holding the supply hose in various extended positions of use; providing retriever mechanism which automatically returns the supply hose to a retracted or stored position upon release from an adjusted position of use; providing retriever mechanism in which the locking mechanism holding the hose in a position of use is actuated by movement of the supply hose without additional manual latching or unlatching; and providing a new retriever construction for a dental saliva ejector hose which eliminates difficulties heretofore encountered, achieves the indicated objectives simply, effectively and inexpensively, and satisfies existing needs in the art.

These objectives and advantages are obtained by the retriever construction, the general nature of which may be stated as including a preferably strip-like post adapted to be mounted in a generally vertically extending position within a dental console and the like and having an edge formed with elongated top release and bottom reset notches, and formed with a plurality of locking notches therebetween; quick-release means including a notch formed in the post edge intermediate the lowermost locking notch and the bottom reset notch; a pulley journalled above said top release notch; traveling car means mounted for movement between upper and lower positions on the post and having spaced pulleys mounted thereon; said pulleys forming hose extensible and retractable loop storage means for a saliva ejector hose threaded in loops around said pulleys; a pawl loosely pivotally mounted on the car means, said pawl and locking notches forming lock means for selectively latching the car means at various positions of adjustment of the car means on the post as the car means moves upward on said post; said pawl having a preferably pointed latching end and a weighted end with the loose pivotal mounting therebetween; said weighted end normally biasing the pawl to release position with its pointed end directed at an angle upwardly toward the post notched edge; said bottom reset notch having an upper shoulder engaged by the pawl pointed end as the car means is moved upwardly from its lower position to reset the pawl in a reset position with its pointed end directed downwardly at an angle toward said post notched edge by engagement of the pawl pointed end with said edge as the pointed end moves along the post above said bottom reset notch; said pawl in reset position having its pointed end engageable selectively in any of said locking notches to latch the car means at a stopped position opposite such selected notch upon movement of the car means upwardly on the post past a locking notch and then permitting the car means to move downwardly; said pawl pointed end being released from engagement with the post upon arrival of the car means at the upper position at the upper end of the post with the pawl opposite the top release notch so that the pawl assumes said release position; said loose mounting permitting the pawl in release position to slide downwardly on the post to the lower car means position; said pawl pointed end when in release position with the car means moving downwardly past the quick-release notch being engageable in said quick-release notch upon reversing car means movement to movement upwardly of the post to move the pawl to reset position upon passing the quick-release notch during upward car means movement; car stop means including a stop member formed on the post below the reset notch engageable with a stop member carried by the car means to stop the car means when moved to the lower position; the car means movement being initiated and controlled by pulling on and permitting the hose to retract into the console; whereby the car means automatically returns the saliva ejector hose to retracted hose storage position looped around the pulleys when said locking pawl is released on arrival at said top release notch upon full extension of the hose.

BRIEF DESCRIPTION OF THE DRAWINGS

FIG. 6 is a side view with portions broken away looking in the direction of the arrows 6—6, FIG. 3;

FIG. 8 is a view similar to FIG. 6 with parts removed showing the retriever locking mechanism in an intermediate locked position;

FIG. 9 is a view similar to FIG. 8 with additional parts removed showing the retriever locking mechanism pawl moving upwardly between locking positions; FIG. 10 is a view similar to FIG. 9 showing the retriever locking pawl in a top release position having moved upward to the top release notch zone;

FIG. 11 is a view similar to FIG. 9, but showing the retriever locking pawl moving downwardly between locking positions;

FIG. 12 is a view similar to FIGS. 9, 10 and 11 showing the retriever locking pawl at the quick-release position; after having moved downwardly to the quick-release position shown in dot-dash lines and then reversed to start upward movement, shown in full lines;

FIG. 13 is a perspective view of the retriever locking pawl; and

FIG. 14 is a sectional view taken on the line 14—14, FIG. 8.

Similar numerals refer to similar parts throughout the drawings.

DESCRIPTION OF THE PREFERRED EMBODIMENT

Figure 1:
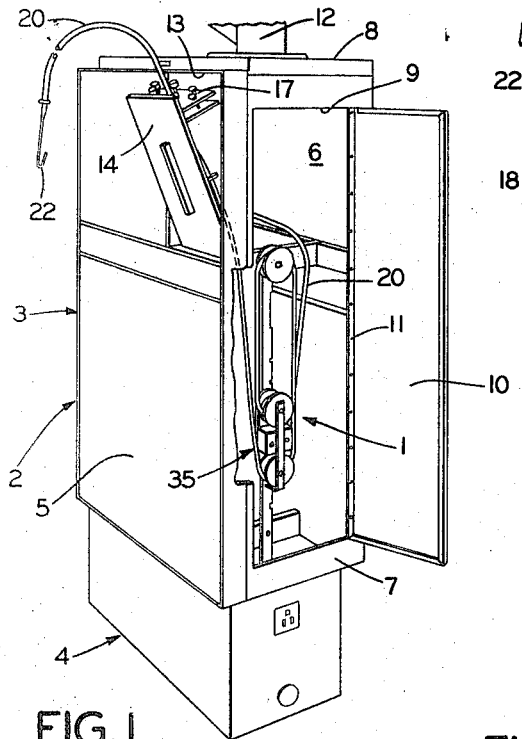
FIG. 1 is a perspective view with portions broken away illustrating a dental cabinet or console in which the improved retriever mechanism for the saliva ejector hose is incorporated.

The improved retriever mechanism is indicated at 1 and is shown typically in the drawings incorporated in a diagrammatically illustrated floor mounted dental cabinet or console 2. Console 2 may be of various shapes or sizes, may house other dental office appliances or accessories, preferably has suitable connections for a supply of water and air for a saliva ejector pump, and drain or waste facilities. Console 2 is located conveniently to a dental chain within easy access to a patient resting, sitting, or reclining on the dental chair.

Figure 2:
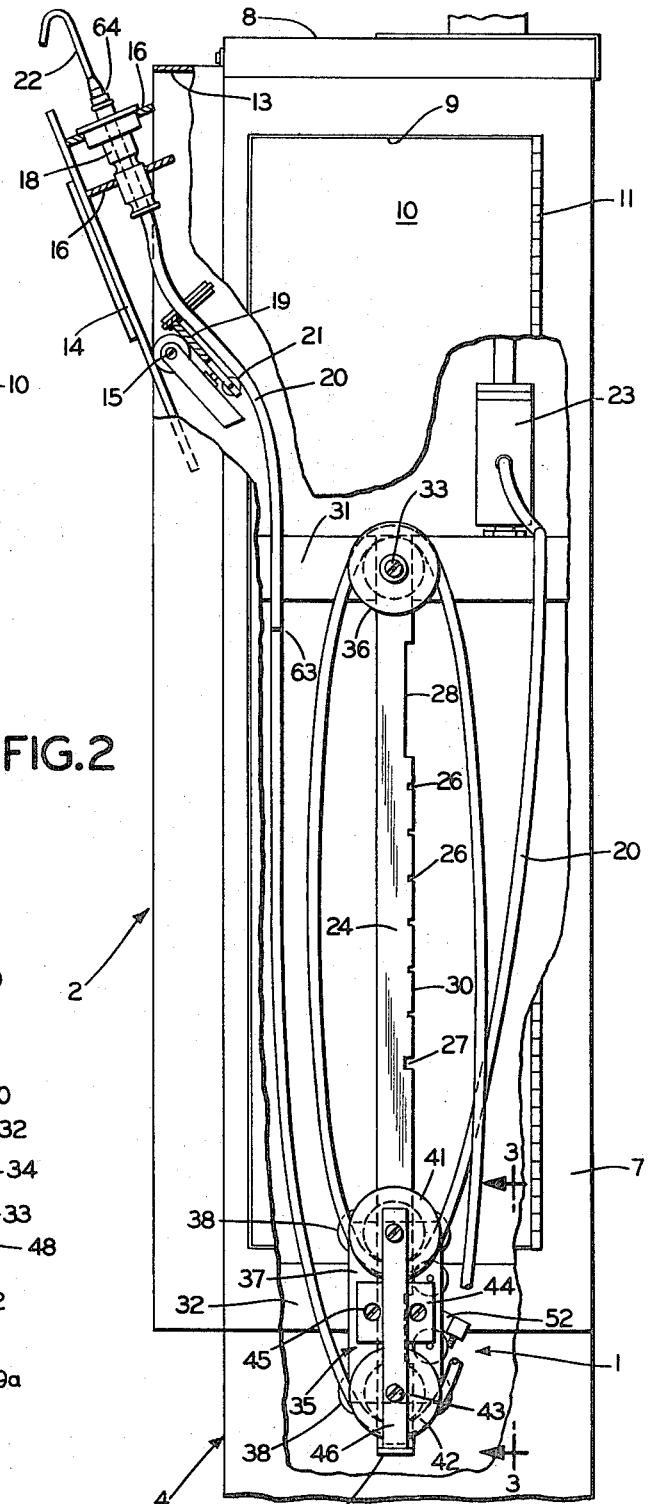
FIG. 2 is a fragmentary side elevational view with portions broken away of the retriever and dental saliva ejector unit within the dental console, with the retriever and ejector hose in fully retracted position.

Console 2 is illustrated as having an upper rectangular boxlike housing 3 mounted on a lower housing 4. Housing 3 may comprise front and rear walls 5 and 6, respectively, side walls 7 and a top wall 8. Each side wall 7 may be formed with an opening 9 to provide access into housing 3 for service and maintenance, which opening is closed by a door 10 hingedly mounted at 11. A dental tray support post 12 may be mounted on top wall 8. Front wall 5 may be formed with an opening 13 in which a door 14 is pivotally mounted near its lower end by a hinge 15. Brackets 16 may be attached to the inside surface of door 14 adjacent the top edge and mount accessory equipment control knobs 17 and a saliva ejector holder 18 (FIG. 2).

A retaining bracket 19 may be mounted on the rear of hinge 15 through which saliva ejector hose 20 extends. Bracket 19 prevents hose 20 from becoming twisted or tangled with other devices as door 14 is opened and closed. A roller 21 also may be mounted near the bottom end of bracket 19 to provide a curved surface over which ejector hose 20 passes when being withdrawn from or returned to console 2. A usual saliva ejector mouthpiece 22 is attached to one end of ejector hose 20, and usual saliva pump means 23 is connected to the other end of hose 20, the pump means 23 also being mounted within console 2.

Retriever 1 includes a generally flat strip-like post 24 having its lower end terminating in a flange 25. Post 24 is formed with a plurality of intermediate spaced locking notches 26, a quick-release notch 27, an elongated top release notch 28 and a bottom reset notch 29 in post edge 30. Post 24 is vertically mounted within console 2 between upper and lower cross support members 31 and 32, respectively, by screw shafts 33 or other suitable mounting means. A spacer sleeve 34 is telescoped on screw 33 at the lower end of part 24 (FIG. 3) to provide sufficient clearance between post 24 and member 32 for vertical movement along post 24 of a traveling car assembly indicated at 35. A rotatable pulley 36 is mounted at a fixed location at the top end of post 24, preferably by journalling pulley 36 on upper screw shaft 33.

Car assembly 35 (FIGS. 3 and 6) includes a rectangular mounting plate 37 having grooved guide wheels 38 attached to the front (right hand side of FIG. 3) of plate 37 at each corner thereof. Wheels 38 preferably are made of Nylon for noiseless operation and friction reduction and each is formed with an annular rim groove 39 having a width just slightly larger than the thickness of post 24. Wheels 38 are journalled on plate 37 by stub shafts 40 and are spaced laterally apart so that the edges of post 24 extend into wheel grooves 39 thereby movably mounting car 35 on post 24.

A pair of spaced pulleys 41 and 42, axially aligned with the post 24 are journalled on bolts 43 at the back of the plate 37 at the upper and lower ends, respectively, thereof, so that the hose 20 may be looped around pulleys 36, 41 and 42, as shown. A weight 44 may be mounted on the back of plate 37 by screws 45, preferably located between pulleys 41 and 42 (FIG. 3) to provide additional weight to return car 35 and hose 20 to the lower position of FIG. 2 from the upper position of FIG. 5. A strap 46 is mounted on the outer ends of bolts 43, and the lower end of strap 46 terminates in an inturned flange 47 and serves the dual purpose of preventing hose 20 from becoming disengaged from pulley 42 and of providing stop means for car 35 at the lower position by contact with post flange 25 (FIG. 2 and 3) when car 35 is at the lower position at the lower end of post 23 and hose 20 is fully retracted.

Figure 3:
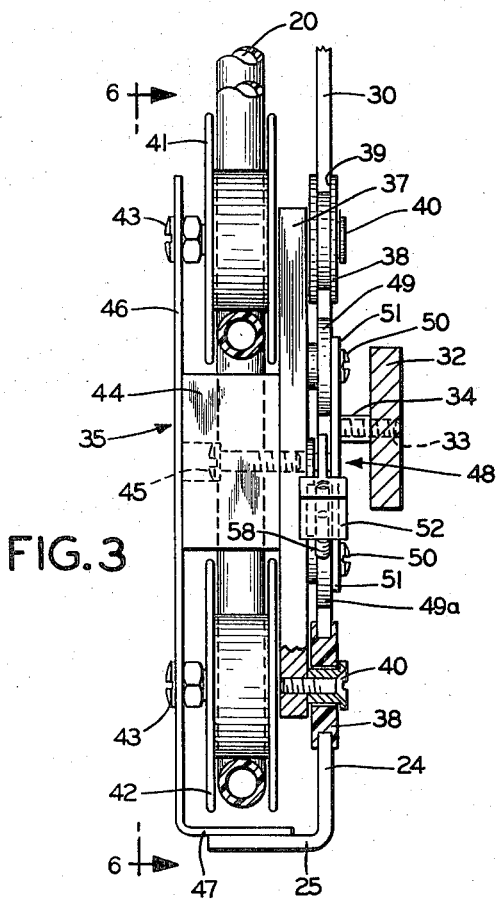
FIG. 3 is an enlarged fragmentary view with parts broken away of the retriever mechanism looking in the direction of the arrows 3—3, FIG. 2.

The locking means for the car 35 by which the car may be latched at various positions of adjustment on post 24 includes the locking notches 26 and the cooperating latching mechanism generally indicated at 48 in FIGS. 3, 6, and 14. Latching mechanism 48 includes a pair of spaced upper and lower locator wheels 49 and 49a which ride along the edge 30 of post 24 as the car 35 runs up and down along post 24.

Wheels 49 and 49a are journalled on the front (the right of FIG. 14) of car plate 37 adjacent the post edge 30 on screw shafts 50 and spacer bearings 50a. The axes of shafts 50 are located in vertical alignment with the axes of the guide wheels 38 at the right of post 24 (FIGS. 6 and 8); and the wheels 49 and 49a also are aligned with the grooves 39 of guide wheels 38 (FIG. 3). A keeper bar 51 extends between the screw shafts 50 on which wheels 49 and 49a are journalled, the keeper bar 51 being clamped by the heads of screw shafts 50 against the ends of spacer bearings 50a which in turn are seated against car mounting plate 37 (FIG. 14).

A compartment thus is formed between keeper bar 51 and mounting plate 37 and between wheels 49 and 49a (FIGS. 6 and 14) in which a locking pawl 52 is loosely pivotally mounted on a pin 53 which extends between keeper bar 51 and mounting plate 37 (FIGS. 3 and 14).

Pawl 52 (FIG. 13) has a heavy or weighted end 54 and a preferably pointed notch engaging end 55. An elongated slot 56 is formed intermediate the ends of the pawl 52 extending at right angles to the axis of the pawl which extends between its weighted and pointed ends 54 and 55. Pin 53 passes through the elongated slot 56 to provide the loose pivotal mounting of the pawl as a part of the latching mechanism 48. An adjusting screw 58 is threaded into an opening 57 in the weighted end 54 of pawl 52 for a purpose to be described later.

The pawl 52 is located opposite reset notch 29 when the car 35 is in the lower position shown in FIGS. 2, 3 and 6, and the hose 20 is fully retracted. At this time the weighted end 54 of pawl 52 tilts pawl 52 so that its pointed end is directed at an angle upwardly toward the notched edge 30 of post 24 as shown in FIGS. 2 and 6. Thus, with car 35 in its lower position, the pawl 52 is normally biased with its pointed end 55 directed upwardly in what may be termed a "release position" of pawl 52. Screw 58 may be adjusted with respect to locator wheel 49a to provide the desired angle for the release position of pawl 52, so that with pin 53 located in the upper end of pawl slot 56, as shown in FIG. 6, the pointed end 55 of pawl 52 projects into reset notch 29.

Figure 4:
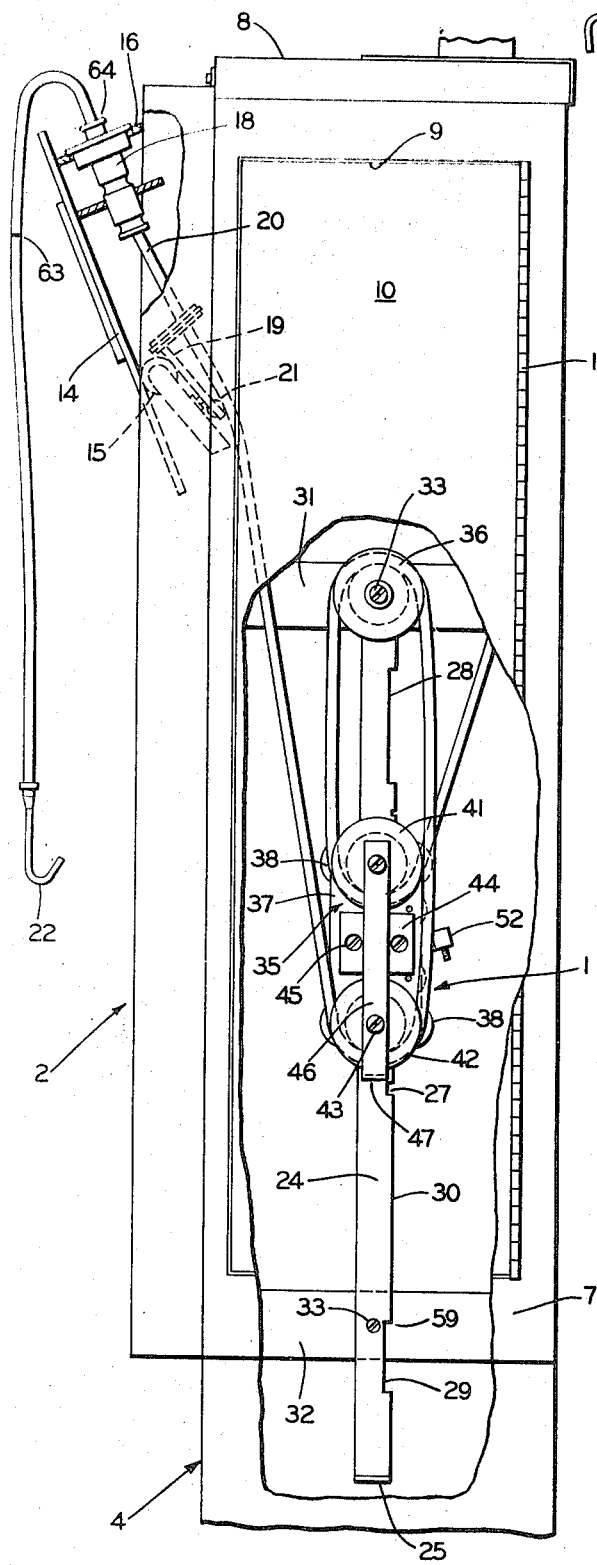
FIG. 4 is a view similar to FIG. 2 showing the retriever and ejector hose in partially extended position.

The reset notch 29 has an upper shoulder 59 which is engaged by the pointed pawl end 55 as the car 35 is moved upwardly from its lower position, thereby resetting pawl 52 to a "reset position" with its pointed end 55 directed downwardly at an angle toward the notched edge 30 of post 24. This reset position is generally shown in FIG. 9 and results by engagement of pawl end 55 with shoulder 59 and the edge 30 of post 24 as the pointed end 55 of pawl 52 moves along the post edge above the bottom reset notch 29 in the direction of the arrow 60 indicated in FIG. 9. This movement as well as the reset position of the pawl 52 also is generally shown in FIG. 4.

Pawl 52 is retained in reset position as car 35 is moved upwardly in the direction of arrow 60 past the several locking notches 26. As pawl 52 passes each locking notch 26 during upward movement, its pointed end 55 clicks into and out of such locking notches. When the car 35 is located at a position so that the pawl 52 is just above any particular notch 26, as shown in FIG. 9, and the movement of car 35 upward is stopped, and the car permitted to move downward, the pointed end 55 of pawl 52 drops into the notch 26 next below and latches car 35 in a stopped position as shown in FIG. 8.

The relationship of the parts shown in FIG. 8, that is, of the pawl 52 angled downwardly toward edge 30 of post 24 with its pointed end 55 engaged in notch 26 and of pivot pin 53 in the upper end of elongated slot 56, is such that the car 35 cannot move downward but is latched or locked in the stopped position shown. However, the car when pulled upward can continue to be moved upward in the direction of the arrow 60 as shown in FIG. 9.

The described relationship of the parts shown in FIG. 8 is one in which the portion of pawl 52 between its pointed end 55 and the elongated slot 56 is wedged between pin 53 and the notch 26 in which the pointed end 55 is engaged. Car 35 finally arrives at a position in which pawl 52 is located opposite top release notch 28 when moved upward in the direction of the arrow 60 (FIG. 9) from a position such as shown in FIG. 4 to that shown in FIGS. 5 and 10.

Upon arrival at the upper position of the car 35 shown in FIG. 10, the pointed pawl end 55 is released from engagement with post 24 and the pawl moves to the release position, biased by its weighted end 54. After such arrival, car 35 may move downward in the direction of the down arrow 61 (FIG. 11) and the upwardly directed pointed end 55 of pawl 52 rides along the edge 30 of post 24. The shifting of pawl 52, generally in the release position of FIG. 10 to a differently angled position of FIG. 11, is permitted because of the loose pivotal mounting of pawl 52 on the car 35, whereby relative movement between pawl 52 and pin 53 may occur as shown in FIG. 11, where pin 53 is in the lower portion of the elongated slot 56, rather than in the upper end of slot 56 as shown in FIG. 10.

Thus, the car 35 having been raised to the upper position of FIG. 10 wherein the pawl 52 moves to release position, is permitted to move downwardly along the post 24 back to the lower car position shown in FIGS. 2 and 6. The car can be pulled upward at any time from the lower position.

Thus far in the description, it has been indicated that when in lower position of FIGS. 2 and 6, the car can be pulled upward and latched as it moves upward selectively at any of the locking notch 26 locations. However, once latched at one of the locking notches 26, the car cannot be lowered excepting by movement first to the upper car position of FIG. 10 where the pawl 52 moves to release position.

Once having arrived at the upper car position, car 35 may be moved freely downwardly to the lower car position and the pawl 52 must be moved to reset position before it will latch the car at a selected locking notch position on the post 24. Normally, pawl 52 is moved to reset position by movement upward from the lower car position of FIG. 6 so that pawl 52 engages shoulder 59 of reset notch 29.

However, in event that the car has been latched at a lock notch such as illustrated in FIG. 8 and it is desired to latch the car at one of the locking notches 26 below the notch 26 shown engaged in FIG. 8, it is not necessary to move the car 35 clear down to the lower car position of FIG. 6 to reset pawl 52. This is the purpose of the quick-release notch 27 below the lowermost locking notch 26 illustrated in FIG. 12.

If car 35 is lowered from upper car position of FIG. 10 to a position of pawl 52 shown in dot-dash lines in FIG. 12, the pointed pawl end 55 drops into the quick-release notch 27 from the position of pawl 52 shown in FIG. 11. If downward movement of car 35 is stopped at this time and car movement reversed upward as indicated by the reverse arrow 62, pawl 52 will pivot about pin 53 as shown in full lines in FIG. 12 to finally assume a reset position which permits the car to be moved upward and latched at any locking notch 26 above quick-release notch 27.

In the foregoing description, car movement in various directions either up or down and the stopping and reversing of car movement has been described. This movement is initiated and accomplished by pulling on or releasing pull on the hose 20, accomplished by manipulation by the dentist or the dentist's assistant holding the mouthpiece 22, which may be grasped and pulled from bracket 16. Downward movement of car 35 is actuated by the weight of the car and of the looped hose 20.

However, whenever the car is latched and stopped in adjusted position at any of the locking notches 26, such as illustrated in FIG. 4, the saliva ejector mouthpiece 22 may be hooked over a patient's lip or jaw and no tension or pull on the patient's jaw results except for the weight of the mouthpiece 22, per se, and such portion of hose 20 that hangs freely therefrom. In other words, there is no pull on the hose of a spring which retrieves the hose as is present in some prior devices. Some prior constructions equipped with spring actuated retrieval devices attempt to relieve the patient's mouth from spring pull by providing a U-clip in which the ejector hose is intended to be held in any adjusted position. However, such U-clips are not reliable, and hoses as well as the spring clips when aged may fail to hold the hose, or the hose may be dislodged readily from a held position which can subject the patient to extreme discomfort.

A hose mark 63 may be placed on hose 20 to indicate to a dentist when pawl 52 is located near to quick-release notch 27 so that retraction of hose 20 may be stopped momentarily and car movement reversed as indicated by arrow 62, to permit the pawl 52 to be moved to reset position at the quick-release notch 27 as shown in full lines in FIG. 12. Thus, complete retraction of the hose into the console 2 and movement of the car to lower car position of FIG. 2 is not required in order to reset the pawl to reset position.

The quick-release notch 27, as shown in FIG. 12, is deeper and of greater length along post edge 30 than any of the locking notches 26. This dimensional difference permits the pawl resetting operation to occur at quick-release notch 27 where there is room for the pointed end 55 of pawl 52 to move between the dot-dash and full line positions shown in FIG. 12. Smaller locking notches 26 cannot accommodate such movement. Similarly the release notch 28 and reset notch 29 each have greater depth and length than locking notches 26, to permit releasing or resetting of the pawl at the locations of notches 28 and 29.

Operation and Use

Saliva hose 20, when not in use, is in fully retracted position, car 35 is resting on flange 25 at the bottom of post 24, and hose 20 is looped about pulleys 36, 41, and 42, as shown in FIG. 2. Mouthpiece 22 may be detachably coupled with the end 64 of hose 20 and removed after each patient use for sterilizing so that door 14 may be closed. Hose 20 preferably has such length that with the car 35 in lower position and hose 20 fully retracted as shown in FIG. 2, some slight slack is present in the hose to eliminate tension thereon during storage. However, the slack is not sufficient to disengage hose 20 from pulleys 36, 41, and 42.

When a dentist or dental assistant wishes to use the saliva ejector, door 14 is opened to the position shown in FIGS. 1 and 2, mouthpiece 22 is inserted and hose 20 pulled upward to the desired position when the car 35 is latched in a selected locking notch 26. Mouthpiece 22 may then be hung on the patient's lip or jaw at the desired position without appreciable pull on the patient.

Figure 5:
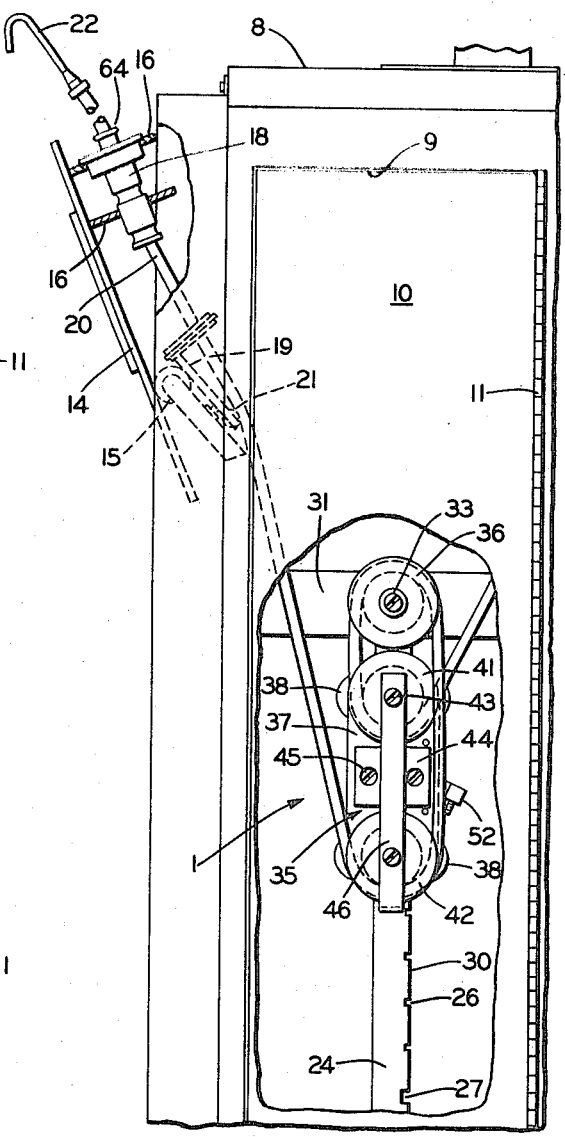
FIG. 5 is a view similar to FIGS. 2 and 4 showing the retriever and ejector hose in fully extended position.
Figure 7:
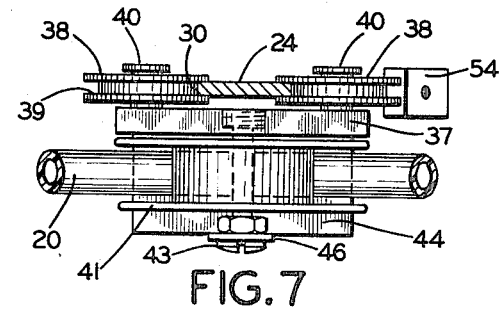
FIG. 7 is a sectional view taken on the line 7—7, FIG. 6.

When the saliva ejector is no longer required, the dentist may grasp the hose near the patient's mouth, remove the mouthpiece 22, pull the hose 20 to the fully extended position of FIG. 5 when pull on hose 20 is released and the hose is automatically retracted to fully retracted position by the described operation of the car 35 and pawl 52.

Accordingly, the retriever mechanism 1 enables a dentist conveniently to use a saliva ejector when necessary with a minimum amount of manipulation and without appreciable pull on the patient's mouth when in use. The mechanism normally is concealed within a console to avoid any unattractive appearance; is simple to manufacture, assemble and manipulate; avoids tangling of the hose with other accessories housed in the console; permits the mouthpiece to be used in various extended positions of the hose positively latched and without pull on the mouthpiece; enables the hose to be easily withdrawn from and returned to a retracted storage position; and provides a construction which achieves the objectives indicated and solves problems existing in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example and the scope of the invention is not limited to the exact details shown or described.

Having now described the features, discoveries and principles of the invention, the manner in which the retriever mechanism for dental saliva ejectors is constructed and used, the characteristics of the construction, and the advantages, new and useful results obtained; the new and useful structures, devices, elements, arrangements, parts, and combinations, are set forth in the appended claims.

We claim:

1. Retriever construction for a dental saliva ejector hose including a post; the post having an edge formed with a series of notches including a release notch adjacent its top end, a reset notch adjacent its bottom end, a plurality of spaced locking notches intermediate the release and reset notches, and a quick-release notch below the locking notches and above the reset notch; car means mounted for movement between upper and lower car positions on the post; pulley means mounted on the post and car means, said pulley means forming hose loop storage means extensible and retractable upon car movement on said post between upper and lower positions for a hose threaded in loops around said pulley means; latch means mounted on the car means and movable between reset and release positions operatively and selectively engageable with said notches upon car movement up and down said post; said latch means being operative in reset position to latch said car means at any selected locking notch location during car movement upward on said post, said latch means automatically moving from reset to release position upon arrival of the car means at the upper end of the post with the latch means adjacent said release notch, said latch means being operative in release position at the upper end of the post to permit the car means to move freely downward on the post by gravity to the lower car position to locate said latch means adjacent said reset notch, said latch means being moved from release to reset position as the car means moves upward from said lower car position, and said latch means being moved from release to reset position when the car means is moved downward on the post to a position at least adjacent said quick-release notch and then moved upward; stop means supporting the car means at lower car position upon arrival of the car means at such position; and movement of the car means being initiated and controlled by pulling on or releasing pull on the hose, whereby the car means automatically returns the hose to retracted hose storage position looped about the pulley means when the latch means moves to release position on arrival of the car means at the upper car position and upon then releasing pull on the hose.

2. The construction defined in claim 1 in which the release, reset, and quick-release notches have greater length and depth than the locking notches.

3. The construction defined in claim 1 in which the pulley means includes a pulley journalled on the post adjacent its top end, and a pair of pulleys journalled in spaced relation on the car means.

4. The construction defined in claim 1 in which the car means includes a rectangular mounting plate and grooved wheels journalled on the plate adjacent each of the four corners of the plate, and in which the grooved wheels engage and travel along the edges of the post in moving between upper and lower car positions on the post.

5. The construction defined in claim 1 in which the stop means comprises a laterally extending flange at the lower end of the post engaging and supporting the car means when the latter is at lower car position.

6. The construction defined in claim 1 in which the pulley means includes a pair of pulleys journalled in vertically spaced relation on the car means; in which a hose guard flange projects below the lower pulley of the pair; and in which the stop means comprises a laterally extending flange at the lower end of the post engaged by the guard flange when the car means is located at lower car position.

7. The construction defined in claim 1 in which the pulley means includes a pair of pulleys journalled in spaced relation on the car means, and in which hose counterbalancing weight means is mounted on the car means between the spaced pulleys of the pair.

8. The construction defined in claim 1 in which the latch means comprises a pawl loosely pivotally mounted on the car means having a notch engageable end selectively engageable with portions of the post notches upon car movement up and down the post.

9. The construction defined in claim 8 in which the loose pivotal mounting of the pawl on the car means includes a pin on the car means extending through an elongated slot formed in the pawl.

10. The construction defined in claim 8 in which the pawl has a pointed end engageable with the edge of the post and notches therein.

11. The construction defined in claim 8 in which the pawl is movable between reset and release positions, and in which the pawl is normally biased to release position.

12. The construction defined in claim 8 in which the pawl has a pointed end and a weighted end, and in which the weighted end normally biases the pawl to release position.

13. The construction defined in claim 8 in which the pawl has a pointed end, and in which the pointed end is directed upwardly at an angle toward the notched post edge when the pawl is in release position.

14. The construction defined in claim 13 including adjustment means for adjusting the release position angle of the pawl.

15. The construction defined in claim 8 in which the pawl has a pointed end, and in which the pointed end is directed downwardly at an angle toward the notched post edge when the pawl is in reset position.

16. The construction defined in claim 8 in which the reset notch has an upper shoulder, and in which said shoulder is engaged by the pawl as the car means is moved upwardly from its lower position to reset the pawl to reset position.

17. The construction defined in claim 8 in which a pair of locator rolls is mounted in spaced relation on the car means, in which the pawl is loosely pivotally mounted on the car means between said locator rolls, in which the pawl has a pointed end, and in which the locator rolls engage and roll on the notched post edge to determine the location of the pointed end with respect to the notched post edge.

18. The construction defined in claim 1 including a dental console, and in which the post is mounted in vertically extending position within the console.

19. Retriever construction for a dental saliva ejector hose including a post, the post having an edge formed with a series of notches including a release notch adjacent its top end, a reset notch adjacent its bottom end, and a plurality of spaced locking notches intermediate the release and reset notches; car means mounted for movement between upper and lower car positions on the post; pulley means mounted on the post and car means, said pulley means forming hose loop storage means extensible and retractable upon car movement on said post between upper and lower positions for a hose threaded in loops around said pulley means; a pawl loosely pivotally mounted on the car means movable between reset and release positions; said pawl and locking notches forming lock means for selectively latching the car means at various locations of the car means on the post opposite a selected one of said locking notches as the car means moves upward on said post; said pawl having an end directed at an angle upwardly toward said notched post edge when the pawl is in release position and said end being directed at an angle downwardly toward said notched post edge when the pawl is in reset position; said pawl being operative in reset position to latch said car means at any selected locking notch location during car movement upward on said post; said latch means automatically moving from reset to release position upon arrival of the car means at the upper end of the post with the pawl adjacent said release notch; said pawl being operative in release position at the upper end of the post to permit the car means to move freely downward on the post by gravity to the lower car position to locate said pawl adjacent said reset notch; and said pawl being moved from release to reset position as the car means moves upward from said lower car position.

20. The construction defined in claim 19 in which the release and reset notches have greater length and depth than the locking notches.

21. The construction defined in claim 19 in which the pulley means includes a pair of pulleys journalled in spaced relation on the car means one above and one below the loosely pivotally mounted pawl.

22. The construction defined in claim 19 in which the loose pivotal mounting of the pawl on the car means includes a pin on the car means extending through an elongated slot formed in the pawl.

23. The construction defined in claim 19 in which the pawl end directed upwardly in release position and downwardly in reset position is pointed, and in which the pointed end is engageable with the edge of the post and notches therein.

24. The construction defined in claim 19 in which the pawl is normally biased to release position.

25. The construction defined in claim 19 in which a pair of locator rolls is mounted in spaced relation on the car means, in which the loose pivotal mounting of the pawl on the car means is located between said locator rolls, in which the pawl end directed upwardly in release position and downwardly in reset position is pointed, and in which the locator rolls engage and roll on the notched post edge to determine the location of the pointed end with respect to the notched post edge.

* * * * *